United States Patent Office 3,700,637
Patented Oct. 24, 1972

3,700,637
DIENE-NITRILE RUBBERS
Albert M. T. Finch, Jr., Houston, Tex., assignor to Shell Oil Company, New York, N.Y.
No Drawing. Continuation-in-part of application Ser. No. 689,274, Dec. 11, 1967. This application May 8, 1970, Ser. No. 35,874
Int. Cl. C08f 27/25; C08d 5/00
U.S. Cl. 260—83.3      7 Claims

ABSTRACT OF THE DISCLOSURE

Substantially alternating copolymers of conjugated dienes and unsaturated nitriles, and their hydrogenated derivatives, are useful rubbers having high strength without vulcanization.

This is a continuation-in-part of my copending application Ser. No. 689,274 filed Dec. 11, 1967, now abandoned.

BACKGROUND OF THE INVENTION

Very important among the synthetic rubber compositions are the nitrile rubbers such as butadiene-acrylonitrile copolymers. These rubbers when prepared with certain proportions of monomers and further treated produce products which have commercial useful strength and elasticity as well as outstanding resistance to chemicals and solvents and especially hydrocarbons and oils. Such properties are desired or necessary for many applications.

It has long been known to those skilled in the art and repeatedly pointed out in the literature, that, unlike natural rubber and some synthetics, the butadiene-acrylonitrile type of copolymers must be compounded with carbon black or similar reinforcing agent and must be vulcanized in order to have strength and elasticity suitable for use as a rubber. The uncompounded and unvulcanized copolymers are very soft and pliable compositions having practically no elasticity or strength to quite brittle thermoplastics having little strength or impact resistance. The relative degree of softness or brittleness depends on the ratio of the respective monomers present in the copolymer. It has been recognized and generally accepted that such a deficiency in physical properties by the untreated copolymers is due to their failure to crystallize on stretching which feature is present in other rubbers such as natural rubber, neoprene and the like; see Whitby, Synthetic Rubber, 823 (1954). Evidence of the failure of the butadiene-acrylonitrile copolymers to exhibit crystallinity when stretched is shown, for example, by Sebrell et al., Rubber Chemistry and Technology, vol. 16, 857–862 (1966).

One of the most important physical properties of rubber is its tensile strength which is a measure of its ability to sustain a load. However, in order to achieve suitable tensile strengths, vulcanization has been necessary for natural rubber and in the case of most synthetic elastomers, including acrylonitrile-butadiene copolymers, compounding with carbon black is additionally necessary to achieve suitable tensile strengths. For example, unvulcanized, well-masticated natural rubber has a tensile strength of between about 50–200 p.s.i. and after vulcanization the tensile strength is increased to as high as about 5,000 p.s.i. On the other hand, unvulcanized nitrile rubber has no significant tensile strength. Even when vulcanized the tensile strength is increased only to about 200–300 p.s.i. In order to achieve tensile strengths from 1,000–3,000 p.s.i., compounding of the vulcanized nitrile rubber with carbon black is necessary. Obviously the vulcanization and compounding of the rubber compositions is expensive and time consuming even though the methods for such treatment of the polymers are well established.

It is an object of this invention to provide solid nitrile rubbers having high strengths and which need not be vulcanized and/or compounded with reinforcing fillers. It is also an object of the invention to provide a process for preparing these nitrile rubbers.

STATEMENT OF THE INVENTION

The nitrile rubbers of this invention are those having a substantial portion of alternating diene-nitrile derived groups. Thus, the copolymers of the invention are those wherein the polymer molecules are made up of a substantial number of groups (—D—N—)

where D represents a diene monomer derived unit and N represents a nitrile derived unit. In more descriptive terms the copolymers of this invention have a Run Number (sequence distribution), as defined hereinafter, of at least 90, which results from a copolymerization process involving maintenance of a nitrile to total monomer ratio between 0.75 and 0.92, low (0–25° C.) polymerization temperatures, and maximum conversions no greater than 35%. Due to the unique structure of these copolymers, vastly improved strengths are realized indicating that vulcanization of these products is unnecessary. Hydrogenated derivatives of this novel class of elastomers also are contemplated.

The sequence distribution is best described in terms of a Run Number, R, signifying the number of polymer sequences (runs) per 100 monomer units in the copolymer. As described, for example, by Harwood and Ritchey, Polymer Letters, volume 2, pp. 601–607 (1964). As an example, the portion of the copolymer chain below contains 20 monomer units arranged in 11 alternating sequences:

—B—AAA—B—B—A—B—A—B—A—A—B—B—B—B—B—A—A—B—

The Run Number R, of this copolymer is therefore 55.
The Run Number R, is related to the reactivity ratios of the individual monomers by the equation:

$$-R = \frac{200}{[2 + r_1(f_1/f_2) + r_2(f_2/f_1)]}$$

wherein

R = run number
$r_1$ and $r_2$ = reactivity ratios of the two monomers
$f_1$ and $f_2$ = mole fractions of the two monomers in the feed.

The reactivity ratios are to be found in the literature or may be experimentally determined.

The copolymers of the invention differ from the corresponding diene-acrylonitrile copolymers of the prior art in that the latter consist generally of randomly placed monomer units throughout the polymer molecule resulting in substantially lower run numbers. This random unit structure is true regardless of what initial concentrations of the respective monomers is used. It is known, for example, that different concentrations of monomers present in the reaction mixture result not only in a copolymer having different percents of the respective monomer derived units, but additionally the random alternation of the respective monomer derived units also will vary with varying monomer concentrations. Such results are dependent on the relative reactivities of the respective monomers with each other as well as the tendencies to homopolymerize at the various concentrations and reaction conditions. Thus, when a polymerization reaction begins with a certain ratio of monomers, once the polymerization has started, the ratio of monomers changes continually throughout the reaction and likewise, the copolymer structure changes accordingly.

The substantially regularly alternating copolymers of the invention, i.e., polymers having Run Numbers in excess of 90, are prepared by reacting the diene and acrylonitrile monomers in critical ratios using free radical initiating catalyst and under suspension or emulsion polymerization techniques. The particular ratios of monomers used in the reaction to obtain the substantially atlernating copolymers will vary depending on the specific monomers used. However, it is important that the particular ratio necessary to obtain the substantially alternating copolymers be determined and closely maintained throughout the reaction. Thus, as the polymerization reaction is carried out, the relative monomer concentrations will vary instantaneously as different proportions of monomers are used thereby requiring careful precautions to ensure a substantially constant monomer ratio wherein the nitrile to total monomer ratio is maintained between 0.75 and 0.92. Moreover, polymerization temperatures must be restricted to between 0 and 25° C. and conversion of total monomers to polymers must be held to 15–35 mole percent.

The dienes used in the copolymerization are conjugated diolefins and preferably those having from 4 to about 8 carbon atoms. Examples include 1,3-butadiene, piperylene, isoprene, 1,3-hexadiene, 2,4-hexadiene, 1,3-heptadiene, etc. Butadiene is preferred because of its availability and the outstanding copolymers prepared therefrom.

The unsaturated nitriles are preferably the acrylonitriles having the formula

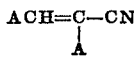

wherein each A is hydrogen or a hydrocarbyl group having from 1 to about 10 carbon atoms. Examples of A groups include alkyl and cycloalkyl, such as methyl, ethyl, isopropyl, t-butyl, octyl, decyl, cyclopentyl, cyclohexyl, etc., and aryls such as phenyl, tolyl, xylyl, ethylphenyl, t-butylphenyl, etc. Acrylonitrile and methacrylonitrile are preferred.

The copolymers are prepared by reaction of the monomers in the presence of a free radical initiator by methods well known to those skilled in the art. Suitable catalysts include organic oxides, peroxides, hydroperoxides, azo compounds, etc., such as hydrogen peroxide, benzoyl peroxide, cumene hydroperoxide, di-tert-butyl peroxide, ascaridole, acetyl peroxide, tert-butyl hydroperoxide, trimethylamine oxide, dimethylaniline oxide, isopropylperoxydicarbonate, diisobutylene ozonide, peracetic acid, nitrates, chlorates, perchlorates, azobisisobutyronitrile, etc. Suitable concentrations are between about 0.0001 and 5% and preferably between 0.001 and 1% by weight of the total reaction mixture.

One of the methods which may be used for polymerizing the monomers is by emulsion polymerization. By this method polymerization takes place in an aqueous medium with the aid of emulsifying agents. The monomeric hydrocarbon reactants are present almost entirely as emulsion or suspension droplets dispersed in the continuous phase.

The emulsifying agent used is not critical and may be anionic, cationic or non-ionic. However, since the aqueous phase is present usually in greater quantity than the organic phase, the use of anionic agents resulting in an oil-in-water type emulsion may be preferred. Suitable emulsifying agents which may be used include such materials as the fatty acids and their soaps including substituted derivatives of the fatty acids and rosin acids, sulfuric esters including salts of sulfated fatty oils and alcohols, alkane sulfonates, alkarylsulfonates, mahogany and petroleum sulfonates, as well as phosphorus containing emulsifying agents. Some specific examples include the alkali metal salts of $C_{12}$ to $C_{18}$ straight-chain carboxylic acids, i.e., sodium stearate, sodium oleate, and mixtures thereof as acids obtained from tallow, coconut oil, palm oil, etc., tall oil acid soaps, sodium lauryl sulfate, sodium dodecyl benzene sulfonate, sodium di(2-ethylhexyl)orthophosphate and the like. Any amount of emulsifying or suspending agent may be used which will provide at least a relatively stable emulsion or suspension of the polymerization ingredients. Generally, from about 0.5 to about 10% by weight of emulsifying agent is sufficient.

The copolymers may also be prepared by polymerizing the monomers in bulk without the addition of other diluents. Alternatively, solution polymerization in the presence of inert hydrocarbon diluents such as butane, pentane, hexane, cyclohexane, offers the advantage of removing heat of polymerization as well as maintaining the solid polymer in a fluid slurry. Other suitable polymerization techniques may also be used.

While the term "substantially alternating" may be used herein to describe the copolymers of the invention a more accurate description is in terms of Run Number, defined hereinbefore. The Run Number is greater than 90, preferably greater than 92, and is achieved only by maintaining the recited monomer ratio, low polymerization temperatures and low level of conversions referred to herein. The copolymers of the invention may be further characterized by the molar ratio of acrylonitrile: diene monomer derived group being between about 1.1:1.0 to 0.9:1.0 which corresponds to a mole percent of acrylonitrile in the copolymer of between about 47% and 53%. Thus, for example, in order to achieve butadiene-acrylonitrile copolymers having not only monomer derived unit ratios within these limits but with also substantial alternation it is necessary to maintain a monomer concentration in the reaction mixture of $$\frac{\text{Moles Acrylonitrile}}{\text{Moles Acrylonitrile} + \text{Moles Butadiene}}$$

of between about 0.75 and 0.92 and more preferably between about 0.80 and 0.90. One simple manner in which the monomer ratio within the reaction mixture may be accomplished is to start the reaction at a acrylonitrile mixture ratio of 0.75 and allow the reaction to proceed until the ratio was about 0.92 and stop the reaction. However, a much more suitable means for a continuous process of preparing the copolymer is to initially introduce a mixture of co-monomers into the reaction which will initially yield a copolymer of the invention and to thereafter maintain the monomer ratios between the necessary limits set forth above. To accomplish this, the reactor should contain a suitable monitoring device device which samples the reaction mixture, analyzes it and detects the changing concentrations of monomers and is programmed to automatically and continuously or periodically cause a set of valves to meter and introduce into the reactor suitable amounts of monomer which will yield the desired alternating polymers. Such a device may work in conjunction with a computer. Alternatively, the reaction feed valves may be manually operated.

The solid copolymers of the invention have unexpectedly outstanding elastomeric properties as compared to similar diene-acrylonitrile copolymers having randomly placed monomer derived units. The unvulcanized and unfilled substantially regularly alternating butadiene-acrylonitrile copolymers of the invention possess tensile strengths at break at 23° C. of, at least 2,000 and preferably about 3,400 lbs. per square inch (p.s.i.) and have glass transition temperatures below about −7° C. Although random butadiene-acrylonitrile copolymers having high acrylonitrile contents, i.e., about 57 mole percent, have tensile strengths at break of higher than about 3,300 p.s.i. they also have much higher glass transition temperatures which make them generally unsuitable as elastomers since at those temperatures and below they are brittle in nature. In accordance with the ASTM definition an elastomer herein refers to a material that retracts within one minute to less than 1.5 times its original length after being stretched at room temperature (20–27° C.) to twice its length and held for one minute before release. In addition, the present copolymers possess superior strength retention properties at elevated temperatures as compared to other butadiene-acrylonitrile copolymers.

The nitrile rubbers of this invention may be selectively hydrogenated. The polymers are prepared by selectively hydrogenating the unsaturated precursor copolymers as will be more fully described hereinafter.

The hydrogenation catalysts which must be used are those which will selectively hydrogenate the ethylenic unsaturation without reducing the nitrile functionality of the polymer. Catalysts which do hydrogenate the nitrile groups are not suitable since the nitrile functionality is essential to the hydrogenated polymer for high strength and crystallization. Prefered hydrogenation catalysts are the homegeneous rhodium halide complex catalyst having the formula $$(R_3E)_3RhX$$

wherein X is a halogen and preferably chlorine or bromine, E is phosphorus or arsenic and R is anorgano group of from 1 to 20 and preferably 1 to 10 carbon atoms and having only aromatic unsaturation. Suitable R groups are, for example, hydrocarbyl groups such as methyl, ethyl, propyl, isopropyl, isooctyl, decyl, cyclohexyl, cyclooctyl and substituted derivative thereof such as bromomethyl, 3-(diethylamino) propyl, etc. R may also be aromatic hydrocarbyl groups such as phenyl, tolyl, xylyl, p-ethylphenyl, p-tertbutylphenyl etc. and substituted derivatives thereof. The R groups may be the same or different, but those wherein they are the same are preferred. The trihydrocarbylphosphines or arsines, $R_3E$, are in actuality stabilizing ligands for the rhodium halide molecules examples of which included triethylphosphine, tributylphosphine, triphenylphosphine, tris(4-methoxyphenyl)phosphine, tris(3-chlorophenyl)phosphine, diethylphenylphosphine, diphenylbutylphosphine, triphenylarsine, diethylphenylarsine, and the like. Triphenylphosphine is generally preferred because of its availability.

It is also desirable to use an excess of the stabilizing ligand, $R_3E$, during the hydrogenation. Molar ratios of ligand to rhodium halide complex of between about 10:1 and about 150:1 and preferably from about 20:1 to about 100:1 are satisfactory. Other catalysts, homogeneous or heterogeneous, may also be used such as, for example, platinum, ruthenium, iridium, palladium, rhenium, cobalt, copper, and compounds thereof such as oxides, sulfides carbonyl, etc. These catalysts may be used alone or supported on an inert material such as carbon diatomaceous earth, alumina, silica, asbestos and the like. Amounts of catalysts between about 0.01 and 10% and preferably between about 0.1 and 5% by weight based on the polymer may be used. The homogeneous catalyst such as the rhodium complex catalyst are used in amounts sufficient to provide from about 50 to 2,000 p.p.m. rhodium based on the polymer.

Hydrogenation at hydrogen pressures between about 500 and 2,000 p.s.i. are suitable and generally preferred although much higher pressures may be used, i.e., up to 10,000 p.s.i. or higher, as well as lower pressures although hydrogenation will proceed much more slowly at pressures in the range of 100 p.s.i. and lower. Suitable methods well known to those skilled in the art such as bubbling the hydrogen through the polymer solution or by pressurizing a closed reaction vessel with hydrogen and containing the polymer and catalysts and mixing the contents.

Complete hydrogenation of the ethylenic unsaturation produces polymers having outstanding properties, but hydrogenation above about 75% so that the residual ethylenic unsaturation is 25% or lower produces polymers having high tensile strengths as compared to the unhydrogenated polymers. Similar copolymers having Run Numbers outside the scope of this invention and which fail to crystallize upon stretching exhibit little if any improvement in tensile strength upon hydrogenation. The polymers of this invention have molecular weights above $20 \times 10^3$, preferably above $75 \times 10^3$; the molecular weight range between $150 \times 10^3$ and $1,000 \times 10^3$ being most preferred.

The nitrile elastomers of the present invention have been found especially suitable for blending with other polymeric materials, for example, it has been found that they are mutually soluble with polyvinyl chloride to form transparent blends having enhanced tensile properties. Other polymers which were not only transparent but had improved tensile strengths including blends of the high Run Number butadiene-acrylonitrile copolymers with polyacrylonitrile, maleic anhydride-propylene copolymers and the like. Another surprising feature of the high Run Number copolymers of this invention comprised their tendency to become oriented when subjected to stress.

In fact, upon orientation, permanent set of the order of about 800% may be realized. Material so oriented displays enhanced tensile strength in the order of 4500 p.s.i. at room temperature and about 200 p.s.i. at 100° C.

Thus the copolymers of the invention are indicated for use in fibers and especially in fibers wrapped with other materials such as cotton and the like and in the use of blends containing them for coating and other purposes. They may be applied either in solution or may be utilized in thermoforming operations as well as in operations involving latex techniques. The latter technique is of special interest for the preparation of dipped goods such as gloves and superficial coatings. Blending of the high Run Number block copolymers with other polymers may be effected by solution blending or latex blending as desired.

The following examples are provided to illustrate the manner in which the invention is carried out. Unless otherwise specified parts are given by weight.

Example I

Butadiene-acrylonitrile copolymers were prepared in 240 ml. reactors by adding the following ingredients thereto:

| | Grams |
|---|---|
| Water | 80 |
| Methanol | 20 |
| Sodium lauryl sulfate | 1 |
| Lauryl mercaptan | 0.0–0.88 |
| Butadiene | 5.3–13.5 |
| Acrylonitrile | 16–50 |

Ten ml. portions of a catalyst mixture prepared by heating 2.4 grams of $NaP_2O_7 \cdot 10H_2O$, 1.39 grams $FeSO_4 \cdot 7H_2O$ and 100 ml. of water at 60° C. for 45 minutes were injected into the reactors. The mixtures were then stirred until emulsified and heated to the desired temperature. A 0.083 g. portion of cumene hydroperoxide was then injected into the reactor and stirring continued until the desired conversion had been achieved.

The polymerization temperature was kept to between about 0° and 25° C. with the conversion being between about 15 and 25 mole percent. The polymers were recovered by pouring the latex into methanol containing hydroquinone mixture which was vigorously stirred in a blender. The polymer was washed repeatedly with methanol and water and dried in a vacuum oven at room temperature overnight. Thus a Sample A was prepared having a Run Number of 92. A second polymer (Sample H) was prepared using conditions outside those of the present invention having the same proportion of acrylonitrile but a Run Number of only 75. Blends of Samples A and H were made to give the series of samples shown in the table below:

TABLE.—EFFECT OF RUN NUMBER ON TENSILE STRENGTH AT 23° C.

| Sample: | Acrylonitrile Run Number in polymer | Tensile strength p.s.i. |
|---|---|---|
| A | 92 | 2,600 |
| B | 91 | 2,300 |
| C | 90 | 2,000 |
| D | 89 | 1,800 |
| E | 88 | 1,500 |
| F | 87 | 1,000 |
| G | 84 | 500 |
| H | 75 | 300 |

As can be seen from the above table, the tensile strength varied sharply with Run Number; and only those samples having Run Numbers of at least 90 gave tensile strengths of a desirable level.

Example II

In order to show the improved properties of the regularly alternating copolymers of the invention over copolymers containing about 50 mole percent acrylonitrile but of a random molecular structure a copolymer was prepared by the general procedure set forth in Example I. However, the initial reaction mixture contained 50 mole percent acrylonitrile and was carried to substantial completion. To copolymer of the reaction initially contained 44% acrylonitrile that prepared at the end of the reaction contained 82% acrylonitrile. The average amount of acrylonitrile in the copolymer was analyzed to be 50.5 mole percent. The copolymer was then tested for tensile strength according to Example I. The tensile strength was 870 p.s.i. at 23° C. By comparison, a "substantially alternating" copolymer having a Run Number of 91.5 containing the same amount of acrylonitrile possessed a tensile strength at 23° C. of 2450 p.s.i.

Example III

Butadiene-acrylonitrile copolymer is prepared as follows:

8.1 grams (0.15 mole) of butadiene and 45.0 grams (0.85 mole) of acrylonitrile are placed in a reactor containing 80 ml. of water, 1 gram of sodium lauryl sulfate and 20 grams of MeOH. The catalyst consisting of 10 ml. $H_2O$, 0.139 gram $FeSO_4 \cdot 7H_2O$ and 0.223 gram $Na_4P_2O_7 \cdot 10H_2O$ is then added to the reaction mixture. The temperature is brought to 0° C. and 0.083 gram of cumene hydroperoxide is added. The reaction mixture is stirred for 45 minutes and poured into 220 ml. methanol containing 0.5 g. hydroquinone. The copolymer is recovered by filtration and washed repeatedly with methanol and water and dried in a vacuum oven at room temperature. The acrylonitrile:butadiene ratio is 1.08:1 and has a tensile strength of 3275 p.s.i.

5.0 grams of the copolymer prepared above is placed in a 300 ml. autoclave containing 185 ml. of chlorobenzene and 15 ml. of m-cresol. Chloro-tris(triphenylphosphone) rhodium (I) (100 mg.) and 1.0 gram triphenylphosphosine are then added to the solution and the vessel purged with hydrogen and then pressured to 1,000 p.s.i. and heated to about 100° C. for 8 hours with constant agitation.

The reaction mixture containing the hydrogenated copolymers is then poured into methanol and agitated. The copolymer precipitates out and is filtered off, washed with methanol until no detectable catalyst color is observed in the wash liquid and dried. The copolymer contains no residual ethylenic unsaturation as evidenced by infrared and NMR analyses. The molded copolymer had a tensile strength of 5,000 p.s.i. X-ray diffraction of the stretched copolymer shows crystallization.

Example IV

The hydrogenation procedure of Example III is repeated except with a copolymer of acrylonitrile:butadiene in a mole ratio of 0.57:1, i.e., outside the scope of the invention, and having a tensile strength of 1,050 p.s.i. (X-ray diffraction of the stretched copolymer showed no crystallization). After hydrogenation, the tensile strength of the molded copolymer was unchanged.

I claim as my invention:

1. A selectively hydrogenated unvulcanized solid elastomeric copolymer of the group consisting of (a) copolymers of a conjugated diene selected from butadiene and isoprene and an unsaturated nitrile

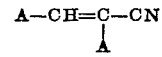

selected from acrylonitrile and methacrylonitrile, the structure of the copolymer being characterized in having a Run Number, as defined in the specification, between 90 and 100 and a molecular weight in the range between 20,000 and $1,000 \times 10^3$; which copolymers prior to hydrogenation have a glass transition temperature below about $-7°$ C. and a tensile strength of at least about 2,000 pounds per square inch at 23° C., wherein above about 75% of the ethylenic unsaturation has been selectively hydrogenated without reducing the nitrile functionality of the polymer.

2. A hydrogenated copolymer according to claim 1 wherein substantially all of the residual diene unsaturation has been reduced by hydrogenation.

3. A hydrogenated copolymer according to claim 1 wherein the unsaturated nitrile is acrylonitrile.

4. A hydrogenated copolymer according to claim 1 wherein the conjugated diene is isoprene.

5. A hydrogenated copolymer according to claim 1 wherein the copolymer is of butadiene and acrylonitrile, the Run Number of the copolymer is at least 92, the molecular weight is greater than about 75,000, and the tensile strength is at least about 2,200 pounds per square inch at 23° C.

6. A hydrogenated copolymer according to claim 1 containing no residual ethylenic unsaturation.

7. A hydrogenated copolymer according to claim 1 wherein the conjugated diene is butadiene.

References Cited

UNITED STATES PATENTS

| 2,374,841 | 5/1945 | Semon. |
| 2,585,583 | 2/1952 | Pinkney. |
| 3,296,228 | 1/1967 | Squire. |

FOREIGN PATENTS

| 466,409 | 7/1950 | Canada. | |
| 1,487,211 | 6/1967 | France | 260—82.1 |

OTHER REFERENCES

Textbook of Polymer Chemistry by Billmeyer (1957), p. 239, "Attainment of Homogeneity in Copolymers."

Properties of Acrylonitrile-Butadiene Alternating Copolymer by Funukawa et al., p. 423; paper presented at 17th annual meeting of polymers, Japan (May 1968), translation pages 1–3.

HARRY WONG, JR., Primary Examiner

W. F. HAMROCK, Assistant Examiner

U.S. Cl. X.R.

260—29.6, 41.5, 82.3, 82.5, 82.7, 83.1

UNITED STATES PATENT OFFICE
CERTIFICATE OF CORRECTION

Patent No. 3,700,637    Dated October 24, 1972

Inventor(s) Albert M. T. Finch, Jr.

It is certified that error appears in the above-identified patent and that said Letters Patent are hereby corrected as shown below:

Column 2, lines 16-18, delete: "A-CH=C-CN"
$$\phantom{xxxxxxxxxxxxxxxxxxxxxxxxxxxxxxxx} |$$
$$\phantom{xxxxxxxxxxxxxxxxxxxxxxxxxxxxxxxxx} A$$

Signed and sealed this 6th day of March 1973.

(SEAL)
Attest:

EDWARD M. FLETCHER, JR.    ROBERT GOTTSCHALK
Attesting Officer           Commissioner of Patents